(12) United States Patent
Lee et al.

(10) Patent No.: US 11,904,858 B2
(45) Date of Patent: Feb. 20, 2024

(54) DRIVING SPEED CONTROL DEVICE FOR AGRICULTURAL WORK VEHICLE, AND DRIVING SPEED CONTROL METHOD FOR AGRICULTURAL WORK VEHICLE

(71) Applicant: LS MTRON LTD., Anyang-si (KR)

(72) Inventors: Jin Woong Lee, Anyang-si (KR); Ji Hun Yu, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 309 days.

(21) Appl. No.: 17/602,595

(22) PCT Filed: Mar. 19, 2020

(86) PCT No.: PCT/KR2020/003740
§ 371 (c)(1),
(2) Date: Oct. 8, 2021

(87) PCT Pub. No.: WO2020/209519
PCT Pub. Date: Oct. 15, 2020

(65) Prior Publication Data
US 2022/0185276 A1 Jun. 16, 2022

(30) Foreign Application Priority Data
Apr. 9, 2019 (KR) .......................... 10-2019-0041273

(51) Int. Cl.
*B60W 30/14* (2006.01)
(52) U.S. Cl.
CPC ....... *B60W 30/143* (2013.01); *B60W 2300/15* (2013.01)
(58) Field of Classification Search
CPC .................... B60W 30/143; B60W 2300/15
(Continued)

(56) References Cited

U.S. PATENT DOCUMENTS 4,715,012 A * 12/1987 Mueller, Jr. ....... G05D 23/1917
701/50
8,190,337 B2   5/2012 McClure et al.
(Continued)

FOREIGN PATENT DOCUMENTS

CA    2762807 A1 *  6/2012 ............. B60K 6/445
CN    103270346 A    8/2013
(Continued)

OTHER PUBLICATIONS

Chinese Office Action for related Chinese Application No. 202080016344.5; action dated Jul. 28, 2022; (12 pages).
(Continued)

*Primary Examiner* — Atul Trivedi
(74) *Attorney, Agent, or Firm* — K&L Gates LLP (57) ABSTRACT

The present disclosure relates to a driving speed control device for an agricultural work vehicle, and a driving speed control method for an agricultural work vehicle, the device comprising: a confirmation unit for confirming set transmission information about a driving device of an agricultural work vehicle, and confirming a transmission mode for controlling an engine and a transmission of the driving device; an acquisition unit, which confirms, from the set transmission information, set revolutions per minute (RPM) relating to RPM of the engine when the transmission mode is an RPM designation mode, so as to acquire transmission information on the basis of the set RPM; and a control unit for controlling the driving device by using the acquired transmission information according to the transmission mode.

12 Claims, 5 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 2006/0167610 | A1* | 7/2006 | Reinards | F16H 61/702 701/56 |
| 2008/0201047 | A1* | 8/2008 | Eisele | F16H 61/0213 701/65 |
| 2009/0029826 | A1* | 1/2009 | Eguchi | F16D 48/066 477/39 |
| 2012/0277061 | A1* | 11/2012 | Ringwald | F16H 61/68 477/107 |
| 2014/0148984 | A1* | 5/2014 | Nishi | B60W 20/10 180/65.265 |
| 2015/0354699 | A1* | 12/2015 | Vora | F16H 61/684 701/58 |
| 2016/0031443 | A1* | 2/2016 | Komatsu | B60W 30/143 701/93 |
| 2018/0112754 | A1 | 4/2018 | Buhrke | |
| 2020/0359547 | A1* | 11/2020 | Sakaguchi | B60W 60/005 |

FOREIGN PATENT DOCUMENTS

| | | | | |
|---|---|---|---|---|
| CN | 106481810 | A | | 3/2017 |
| CN | 107585156 | A | | 1/2018 |
| EP | 2965938 | A2 | * | 1/2016 ............ B60K 20/08 |
| IN | 105452976 | A | | 3/2016 |
| JP | S6393637 | A | | 4/1988 |
| JP | H05319145 | A | | 12/1993 |
| JP | 2003314679 | A | | 11/2003 |
| JP | 2007022406 | A | | 2/2007 |
| JP | 2008086247 | A | | 4/2008 |
| JP | 2015057346 | A | * | 3/2015 |
| JP | 2015065894 | A | * | 4/2015 ........... A01D 69/025 |
| JP | 5817291 | B2 | * | 11/2015 |
| JP | 2016199268 | A | * | 12/2016 |
| JP | 2018127214 | A | * | 8/2018 |
| KR | 19990011591 | A | | 2/1999 |
| KR | 20030082905 | A | | 10/2003 |
| KR | 101501021 | B1 | * | 3/2015 |
| KR | 20150024743 | A | * | 3/2015 |
| KR | 20180053075 | A | | 5/2018 |
| KR | 20180053075 | A | * | 5/2018 |
| KR | 101872187 | B1 | | 6/2018 |
| RU | 2665151 | C2 | * | 8/2018 ............. B60K 17/28 |

OTHER PUBLICATIONS

International Search Report for related International Application No. PCT/KR2020/003740; report dated Oct. 15, 2020; (5 pages).
Written Opinion for related International Application No. PCT/KR2020/003740; report dated Oct. 15, 2020; (6 bages).
Second Office Action for related Chinese Application No. 202080016344.5; action dated Apr. 28, 2023; (7 pages).
Office Action for related Japanese Application No. 2021-555332; action dated Nov. 22, 2022; (3 pages).
Search Report for related European Application No. 20787001.5; action dated Dec. 12, 2022; (7 pages).

* cited by examiner

DRIVING SPEED CONTROL DEVICE FOR AGRICULTURAL WORK VEHICLE, AND DRIVING SPEED CONTROL METHOD FOR AGRICULTURAL WORK VEHICLE

CROSS-REFERENCE TO RELATED APPLICATIONS

The present application is a National Stage of International Application No. PCT/KR2020/003740 filed on Mar. 19, 2020, which claims the benefit of Korean Patent Application No. 10-2019-0041273, filed on Apr. 9, 2019 with the Korean Intellectual Property Office, the entire contents of each hereby incorporated by reference.

FIELD

The present disclosure relates to a control device and a control method for controlling a driving speed of an agricultural work vehicle.

BACKGROUND

Agricultural working vehicles are used to cultivate crops, which are required for human life, using soil. For example, combines, tractors, rice transplanters, and the like are examples of agricultural working vehicles. Combines reap and thresh crops such as rice, barley, wheat, and beans. Tractors perform work required to cultivate crops using traction force. Rice transplanters perform work of transplanting rice seedlings grown in seed beds or seedling boxes to paddy fields. A driving speed of an agricultural work vehicle needs to be adjusted in a work process as necessary. To this end, an agricultural work vehicle includes a driving device. The driving device includes an engine which generates power required for the work and a transmission which adjusts a torque, a speed, and the like of the power generated by the engine.

In agricultural work vehicles according to the conventional technology, a driver controls a driving device through a manual operation in order to adjust a driving speed to be suitable for work. Accordingly, the agricultural work vehicles according to the conventional technology have a problem in that it is difficult to control the driving device at a driving speed suitable for the work.

SUMMARY

Therefore, the present disclosure is designed to solve the problem described above and to provide a driving speed control device for an agricultural work vehicle and a method of controlling a driving speed of an agricultural work vehicle capable of overcoming the difficulty of controlling a driving device.

To solve the above problems, the present disclosure may include the following configurations.

A driving speed control device for an agricultural work vehicle according to the present disclosure may include a confirmation unit which confirms set gear shift information for a driving device included in an agricultural work vehicle and a gear shift mode for controlling an engine and a transmission which are included in the driving device, an acquisition unit which confirms a set number of revolutions for revolutions per minute (RPM) of the engine from the set gear shift information and acquires gear shift information on the basis of the set number of revolutions when the gear shift mode is a revolution number designation mode, and a control unit which controls the driving device using the gear shift information acquired according to the gear shift mode.

A method of controlling a driving speed of an agricultural work vehicle according to the present disclosure may include confirming set gear shift information for a driving device included in an agricultural work vehicle, confirming a gear shift mode for controlling an engine and a transmission which are included in the driving device, when the gear shift mode is a revolution number designation mode, confirming a set number of revolutions for revolutions per minute (RPM) of the engine from the set gear shift information, setting the set number of revolutions as a target number of revolutions, and acquiring gear shift information for shifting gears to the target number of revolutions, and controlling the driving device using the gear shift information acquired according to the gear shift mode.

According to the present disclosure, the following effects can be obtained.

Since the present disclosure is implemented to automatically acquire gear shift information for controlling a driving device included in an agricultural work vehicle using set gear shift information and a gear shift mode, ease and accuracy of an operation of controlling a driving speed to be suitable for work performed by the agricultural work vehicle can be improved.

DETAILED DESCRIPTION

Hereinafter, embodiments of a driving speed control device for an agricultural work vehicle according to the present disclosure will be described in detail with reference the accompanying drawings.

Figure 1:
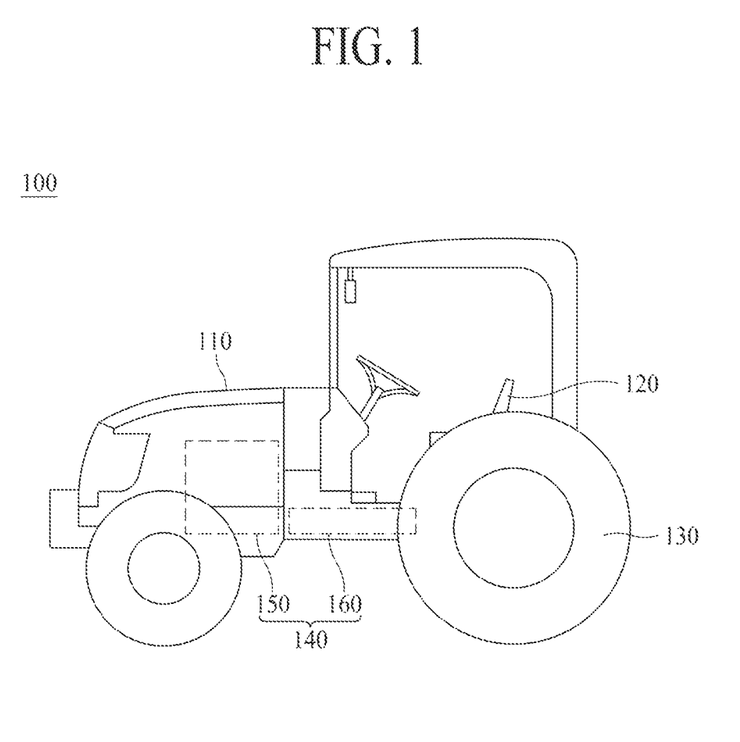
FIG. 1 is a schematic side view illustrating one example of an agricultural work vehicle.
Figure 2:
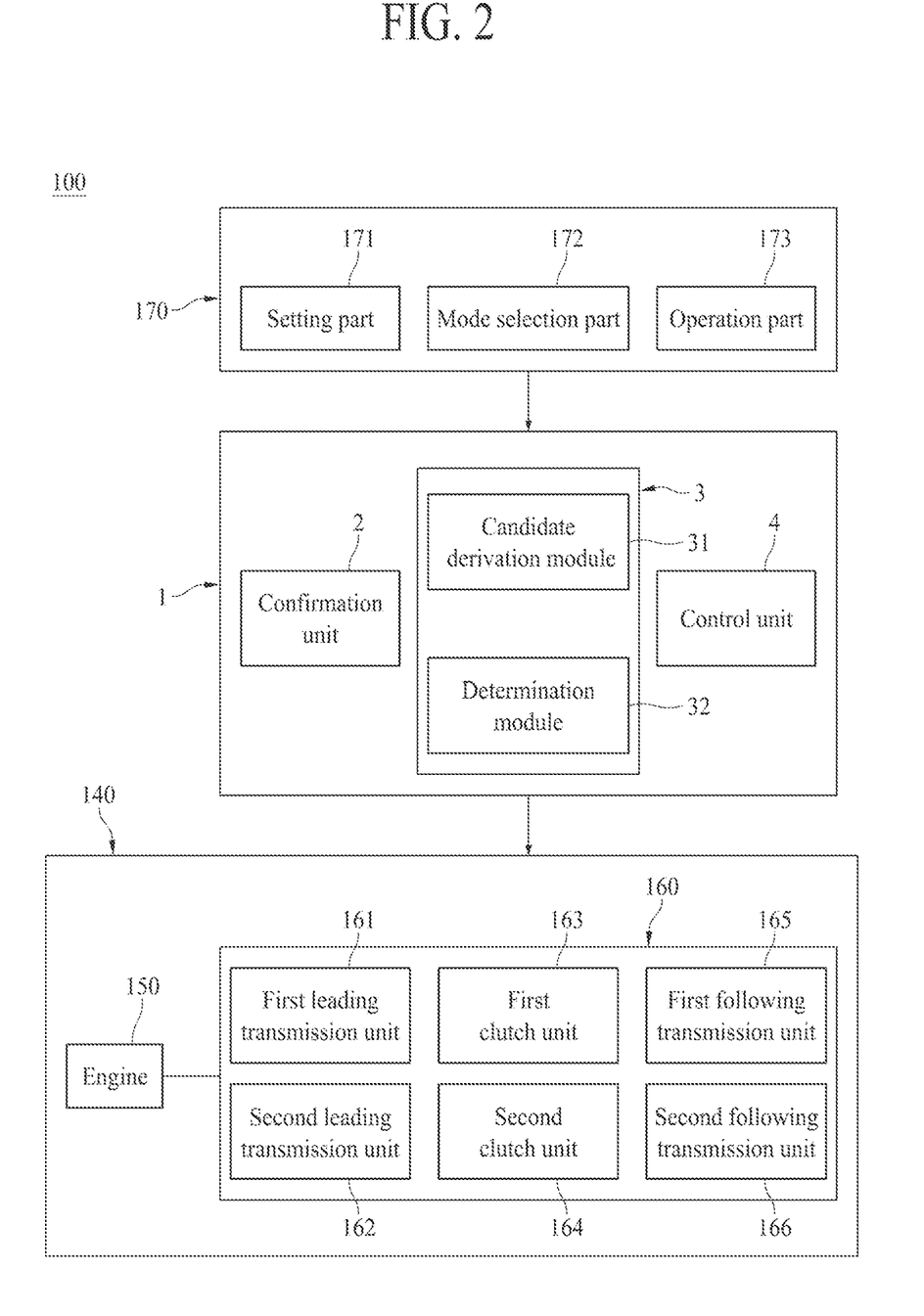
FIG. 2 is a schematic block diagram illustrating a driving speed control device for an agricultural work vehicle according to the present disclosure.

Referring to FIGS. 1 and 2, a driving speed control device 1 for an agricultural work vehicle according to the present disclosure is applied to an agricultural work vehicle 100. The agricultural work vehicle 100 is used to cultivate crops required for human life using soil. For example, the agricultural work vehicle 100 may be a combine, a tractor, a rice transplanter, or the like.

Before the driving speed control device 1 for an agricultural work vehicle according to the present disclosure is described, the agricultural work vehicle 100 will be described below.

The agricultural work vehicle 100 may include a vehicle body 110, a driver's seat 120 provided in the vehicle body 110, wheels 130 coupled to the vehicle body 110, and a driving device 140 coupled to the vehicle body 110. The driving device 140 may include an engine 150 coupled to the vehicle body 110 and a transmission 160 coupled to the vehicle body 110.

The driving device 140 may drive the vehicle body 110. In this case, in the agricultural work vehicle 100, when power generated by the engine 150 is transmitted to the wheel 130 after the power is shifted by the transmission 160, the wheel 130 may rotate so that the vehicle body 100 may travel. In this case, a driving speed of the agricultural work vehicle 100 may change according to revolutions per minute (RPM) of the engine 150 and a gear stage executed by the transmission 160. A working machine (not shown) may be installed in the agricultural work vehicle. The agricultural work vehicle 100 may operate the working machine using the power generated by the engine 150 and shifted by the transmission 160.

The transmission 160 shifts the power generated by the engine 150. A dual clutch transmission (DCT) may be implemented as the transmission 160. In this case, the transmission 160 may include a first leading transmission unit 161, a second leading transmission unit 162, a first clutch unit 163, a second clutch unit 164, a first following transmission unit 165, and a second following transmission unit 166.

Each of the first leading transmission unit 161 and the second leading transmission unit 162 shifts the power transmitted from the engine. Each of the first leading transmission unit 161 and the second leading transmission unit 162 may include a plurality of gears and at least one sleeve. The first leading transmission unit 161 and the second leading transmission unit 162 may shift to different leading gear stages. The first leading transmission unit 161 may form leading gear stages corresponding to odd-numbered gear stages, and the second leading transmission unit 162 may form leading gear stages corresponding to even-numbered gear stages. For example, in a case in which there are eight leading gear stages, the first leading transmission unit 161 may shift to one leading gear stage among first, third, fifth, and seventh gear stages, and the second leading transmission unit 162 may shift to one leading gear stage among second, fourth, and sixth gear stages. The first leading transmission unit 161 and the second leading transmission unit 162 may be implemented as a main transmission part.

Each of the first clutch unit 163 and the second clutch unit 164 selectively transmits the power. Each of the first clutch unit 163 and the second clutch unit 164 may be implemented to selectively transmit the power using a plurality of friction members. For example, a multiple disk clutch which transmits power using friction may be implemented as each of the first clutch unit 163 and the second clutch unit 164.

The first clutch unit 163 may be connected to the first leading transmission unit 161 and the first following transmission unit 165. In this case, the first clutch unit 163 may selectively transmit power transmitted from the first leading transmission unit 161 to the first following transmission unit 165. In a case in which the first clutch unit 163 is coupled, the power transmitted from the first leading transmission unit 161 may be transmitted to the first following transmission unit 165 through the first clutch unit 163. In a case in which coupling of the first clutch unit 163 is released, the power transmitted from the first leading transmission unit 161 is not transmitted to the first following transmission unit 165 through the first clutch unit 163.

The second clutch unit 164 may be connected to the second leading transmission unit 162 and the second following transmission unit 166. In this case, the second clutch unit 164 may selectively transmit power transmitted from the second leading transmission unit 162 to the second following transmission unit 166. In a case in which the second clutch unit 164 is coupled, the power transmitted from the second leading transmission unit 162 may be transmitted to the second following transmission unit 166 through the second clutch unit 164. In a case in which coupling of the second clutch unit 164 is released, the power transmitted from the second leading transmission unit 162 is not transmitted to the second following transmission unit 166 through the second clutch unit.

The first following transmission unit 165 shifts the power transmitted from the first leading transmission unit 161 through the first clutch unit 163. The second following transmission unit 166 shifts the power transmitted from the second leading transmission unit 162 through the second clutch unit 164. Each of the first following transmission unit 165 and the second following transmission unit 166 may include a plurality of gears and at least one sleeve. Each of the first following transmission unit 165 and the second following transmission unit 166 may shift to one of a plurality of following gear stages. For example, in a case in which there are three following gear stages, each of the first following transmission unit 165 and the second following transmission unit 166 may be implemented to shift to one following gear stage among high, middle, and low stages. The first following transmission unit 165 and the second following transmission unit 166 may be implemented as a sub-transmission part. Although not illustrated in the drawings, the transmission 160 may also be implemented to include one following transmission unit connected to both the first clutch unit 163 and the second clutch unit 164.

The driving speed control device 1 for an agricultural work vehicle according to the present disclosure may include a confirmation unit 2, an acquisition unit 3, and a control unit 4 in order to control the driving device 140. The driving speed control device 1 for an agricultural work vehicle according to the present disclosure may be coupled to the vehicle body 110.

Referring to FIG. 2, the confirmation unit 2 confirms set gear shift information and a gear shift mode. The set gear shift information relates to the driving device 140. The set gear shift information may include at least one of a set number of revolutions and a set speed. The set number of revolutions relates to the RPM of the engine 150. The set speed relates to a driving speed of the agricultural work vehicle 100. The gear shift mode relates to a control mode for controlling the driving device 140. In this case, the engine 150 and the transmission 160 which are included in the driving device 140 may be controlled in the gear shift mode.

The confirmation unit 2 may confirm the set gear shift information and the gear shift mode using information provided from an operation unit 170 included in the agricultural work vehicle 100. The operation unit 170 may be disposed near the driver's seat 120 so that a driver can operate the operation unit 170.

The confirmation unit 2 may confirm at least one of the set number of revolutions and the set speed from the set gear shift information provided from a setting part 171 included in the operation unit 170. The setting part 171 is used to set the set gear shift information. The driver may set the set gear shift information by operating the setting part 171 to set at least one of the set number of revolutions and the set speed.

The confirmation unit 2 may confirm the gear shift mode using selection information provided from a mode selection part 172 included in the operation unit 170. The mode selection part 172 is used to select the gear shift mode. The driver may select the gear shift mode by operating the mode selection part 172.

Referring to FIG. 2, the acquisition unit 3 acquires gear shift information. The gear shift information includes RPM of the engine 150, a gear stage of the transmission 160, and the like. For example, the gear shift information may include the RPM of the engine 150, the leading gear stage of the transmission 160, the following gear stage, whether the first clutch unit 163 is coupled, whether the second clutch unit 164 is coupled, and the like.

The acquisition unit 3 may acquire different gear shift information according to which of a revolution number designation mode and a speed designation mode is the gear shift mode, which is confirmed through the confirmation unit 2. The speed designation mode may include a speed first mode, a power mode, an eco mode, and the like. In this case, the acquisition unit 3 may be implemented to acquire different gear shift information according to which of the revolution number designation mode, the speed first mode, the power mode, the eco mode, and the like is selected as the gear shift mode, which is confirmed through the confirmation unit 2. The driver may operate the mode selection part 172 to select any one among the revolution number designation mode, the speed first mode, the power mode, the eco mode, and the like.

When the gear shift mode is the revolution number designation mode, the acquisition unit 3 may confirm the set number of revolutions from the set gear shift information and acquire the gear shift information on the basis of the set number of revolutions. In this case, the acquisition unit 3 may acquire gear shift information which allows the gears to be shifted so that the RPM of the engine 150 becomes the same as the set number of revolutions even when a driving speed becomes different from a set speed. The acquisition unit 3 may acquire the gear shift information which allows the gears to be shifted so that the RPM of the engine 150 becomes the same as the set number of revolutions and the driving speed becomes closest to the set speed. Accordingly, in the case of work in which it is important to operate at a set number of revolutions, the acquisition unit 3 may acquire gear shift information suitable for the corresponding work.

When the gear shift mode is the speed designation mode, the acquisition unit 3 may confirm the set speed from the set gear shift information and acquire the gear shift information on the basis of the set speed. In this case, the acquisition unit 3 may acquire gear shift information which allows the gears to be shifted so that a driving speed becomes the same as the set speed even when an RPM of the engine 150 becomes different from a set number of revolutions. In a case in which the gear shift mode is the speed first mode of the speed designation mode, the acquisition unit 3 may acquire gear shift information which allows the gears to be shifted so that a driving speed becomes the same as a set speed, and the RPM of the engine 150 becomes closest to a set number of revolutions. In a case in which the gear shift mode is the power mode of the speed designation mode, the acquisition unit 3 may acquire gear shift information which allows the gears to be shifted so that a driving speed becomes the same as a set speed, and the RPM of the engine 150 is maximized. In a case in which the gear shift mode is the eco mode of the speed designation mode, the acquisition unit 3 may acquire gear shift information which allows the gears to be shifted so that a driving speed becomes the same as a set speed, and the RPM of the engine 150 is minimized. Accordingly, in the case of work in which it is important to drive at a set speed, the acquisition unit 3 may acquire gear shift information suitable for the corresponding work.

As described above, the driving speed control device 1 for an agricultural work vehicle according to the present disclosure is implemented to acquire gear shift information suitable for work performed by the agricultural work vehicle 100 using the set gear shift information and the gear shift mode. In this case, the set gear shift information may include at least one of the set number of revolutions and the set speed. The gear shift information may include the RPM of the engine 150, the leading gear stage and the following gear stage of the transmission 160, whether the first clutch unit 163 is coupled, whether the second clutch unit 164 is coupled, and the like. Accordingly, since the driving speed control device 1 for an agricultural work vehicle according to the present disclosure is implemented to automatically acquire the gear shift information using the set gear shift information and the gear shift mode, ease and accuracy of an operation of controlling the driving device 140 to be suitable for work performed by the agricultural work vehicle 100 can be improved.

The acquisition unit 3 may include a candidate derivation module 31 and a determination module 32.

The candidate derivation module 31 derives candidate gear shift information. The candidate derivation module 31 may derive different candidate gear shift information according to the gear shift mode. The candidate derivation module 31 may also derive a plurality of pieces of candidate gear shift information.

When the gear shift mode is the revolution number designation mode, the candidate derivation module 31 may set the set number of revolutions as a target number of revolutions and derive candidate gear shift information for shifting the gears to the target number of revolutions. In this case, the candidate derivation module 31 may derive candidate gear shift information which allows the gears to be shifted so that the RPM of the engine 150 becomes the same as the target number of revolutions even when a driving speed becomes different from the set speed. The candidate derivation module 31 may derive candidate gear shift information which allows the gears to be shifted so that the RPM of the engine 150 becomes the same as the target number of revolutions and the driving speed becomes close to the set speed.

For example, in a case in which the set number of revolutions is set to 2,000 RPM, the set speed is set to 20 km/h, and the revolution number designation mode is selected as the gear shift mode, the candidate derivation module 31 may set 2,000 RPM as the target number of revolutions and derive candidate gear shift information which allows the RPM of the engine 150 to become 2,000 RPM and allows a driving speed to become close to 20 km/h. The candidate derivation module 31 may derive a plurality of pieces of candidate gear shift information. In this case, among the pieces of candidate gear shift information, one piece of candidate gear shift information (hereinafter referred to as "first candidate gear shift information") may be derived so that a driving speed becomes 22 km/h by allowing the RPM of the engine 150 to become 2,000 RPM, allowing the leading gear stage of the transmission 160 to be the first stage, allowing the following gear stage to be the high stage, allowing the first clutch unit 163 to be coupled, and allowing coupling of the second clutch unit 164 to be released. In this case, among the pieces of candidate gear shift information, another piece of candidate gear shift information (hereinafter referred to as "second candidate gear shift information") may be derived so that a driving speed becomes 19 km/h by allowing the RPM of the engine 150 to become 2,000 RPM, allowing the leading gear stage of the transmission 160 to be the eighth stage, allowing the following gear stage to be the middle stage, allowing coupling of the first clutch unit 163 to be released, and allowing the second clutch unit 164 to be coupled. The candidate derivation module 31 may also derive three or more pieces of candidate gear shift information. The candidate derivation module 31 may derive one piece of candidate gear shift information. That is, when the gear shift mode is the revolution number designation mode, the candidate derivation module 31 may derive at least one piece of candidate gear shift information.

The candidate derivation module 31 may derive candidate gear shift information which allows the gears to be shifted so that the RPM of the engine 150 becomes the same as the target number of revolutions and a driving speed becomes close to the set speed by performing calculation. The candidate derivation module 31 may also derive candidate gear shift information which allows the gears to be shifted so that the RPM of the engine 150 becomes the same as the target number of revolutions and a driving speed becomes close to the set speed by reading prestored data.

When the gear shift mode is the speed first mode of the speed designation mode, the candidate derivation module 31 may set the set speed as a target speed and derive candidate gear shift information for shifting the gears to the target speed. In this case, the candidate derivation module 31 may derive candidate gear shift information which allows the gears to be shifted so that a driving speed becomes the same as the target speed even when the RPM of the engine 150 becomes different from the set number of revolutions. The candidate derivation module 31 may derive candidate gear shift information which allows the gears to be shifted so that a driving speed becomes the same as the target speed, and the RPM of the engine 150 becomes close to the set number of revolutions.

For example, in a case in which the set number of revolutions is set to 2,000 RPM, the set speed is set to 20 km/h, and the speed first mode of the speed designation mode is selected as the gear shift mode, the candidate derivation module 31 may set 20 km/h as the target speed and derive candidate gear shift information which allows the gears to be shifted so that a driving speed is 20 km/h, and the RPM of the engine 150 becomes close to 2,000 RPM. The candidate derivation module 31 may also derive a plurality of pieces of candidate gear shift information. In this case, among the pieces of candidate gear shift information, one piece of candidate gear shift information (hereinafter referred to as "third candidate gear shift information") may be derived so that a driving speed becomes 20 km/h by allowing the RPM of the engine 150 to become 1,850 RPM, allowing the leading gear stage of the transmission 160 to be the first stage, allowing the following gear stage to be the high stage, allowing the first clutch unit 163 to be coupled, and allowing coupling of the second clutch unit 164 to be released. Among the pieces of candidate gear shift information, one piece of candidate gear shift information (hereinafter referred to as "fourth candidate gear shift information") may be derived so that a driving speed becomes 20 km/h by allowing the RPM of the engine 150 to become 2,100 RPM, allowing the leading gear stages of the transmission 160 to be the eighth stage, allowing the following gear stage to be the middle stage, allowing coupling of the first clutch unit 163 to be released, and allowing the second clutch unit 164 to be coupled. Among the pieces of candidate gear shift information, another piece of candidate gear shift information (hereinafter referred to as "fifth candidate gear shift information") may be derived so that a driving speed becomes 20 km/h by allowing the RPM of the engine 150 to become 2,350 RPM, allowing the leading gear stage of the transmission 160 to be the seventh stage, allowing the following gear stage to be the middle stage, allowing the first clutch unit 163 to be coupled, and allowing coupling of the second clutch unit 164 to be released. The candidate derivation module 31 may derive four or more pieces of candidate gear shift information. The candidate derivation module 31 may also derive one piece of candidate gear shift information. That is, when the gear shift mode is the speed first mode of the speed designation mode, the candidate derivation module 31 may derive at least one piece of candidate gear shift information.

The candidate derivation module 31 may derive candidate gear shift information which allows the gears to be shifted so that the driving speed becomes the same as the target speed and the RPM of the engine 150 becomes close to the set number of revolutions by performing calculation. The candidate derivation module 31 may also derive candidate gear shift information which allows the gears to be shifted so that the driving speed becomes the same as the target speed and the RPM of the engine 150 becomes close to the set number of revolutions by reading prestored data.

When the gear shift mode is the power mode or the eco mode of the speed designation mode, the candidate derivation module 31 may set the set speed as a target speed and derive candidate gear shift information for shifting the gears to the target speed. In this case, the candidate derivation module 31 may derive candidate gear shift information which allows the gears to be shifted so that the driving speed becomes the same as the target speed.

For example, in a case in which the set speed is set to 20 km/h, and the power mode or the eco mode of the speed designation mode is selected as the gear shift mode, the candidate derivation module 31 may set 20 km/h as the target speed and derive candidate gear shift information which allows the gears to be shifted so that a driving speed becomes 20 km/h. The candidate derivation module 31 may also derive a plurality of pieces of candidate gear shift information. In this case, the candidate derivation module 31 may derive the third candidate gear shift information, the fourth candidate gear shift information, and the fifth candidate gear shift information. The candidate derivation module 31 may also derive four or more pieces of candidate gear shift information. The candidate derivation module 31 may also derive one piece of candidate gear shift information. That is, when the gear shift mode is the power mode or the eco mode of the speed designation mode, the candidate derivation module 31 may derive at least one piece of candidate gear shift information.

The candidate derivation module 31 may derive candidate gear shift information which allows the gears to be shifted so that the driving speed becomes the same as the target speed by performing calculation. The candidate derivation module 31 may also derive candidate gear shift information which allows the gears to be shifted so that the driving speed becomes the same as the target speed by reading prestored data.

Although the same candidate gear shift information in the speed first mode, the power mode, and the eco mode is exemplified, the present disclosure is not limited thereto, and the candidate gear shift information may be differently derived for each mode.

The determination module 32 determines the gear shift information. In a case in which the candidate derivation module 31 derives one piece of candidate gear shift information, the determination module 32 may determine the corresponding candidate gear shift information as the gear shift information. In a case in which the candidate derivation module 31 derives a plurality of pieces of candidate gear shift information, the determination module 32 may determine one piece of candidate gear shift information as the gear shift information. In this case, the determination module 32 may determine different candidate gear shift information as the gear shift information according to the gear shift mode.

When the gear shift mode is the revolution number designation mode, among candidate speeds included in the pieces of candidate gear shift information, the determination module 32 may determine a candidate speed having a smallest difference from the set speed as a target speed and determine the candidate gear shift information including the determined target speed as the gear shift information. For example, as described above, in a case in which the set number of revolutions is 2,000 RPM, the set speed is 20 km/h, and the first candidate gear shift information and the second candidate gear shift information are derived in the revolution number designation mode, the determination module 32 may determine 19 km/h, which is a candidate speed having a smallest difference from the set speed, as the target speed and determine the second candidate gear shift information including the target speed as the gear shift information. Accordingly, the gear shift information may be derived so that a driving speed becomes 19 km/h by allowing the RPM of the engine 150 to become 2,000 RPM, allowing the leading gear stage of the transmission 160 to be the eighth stage, allowing the following gear stage to be the middle stage, allowing coupling of the first clutch unit 163 to be released, and allowing the second clutch unit 164 to be coupled. Meanwhile, in a case in which the candidate derivation module 31 derives only one piece of candidate gear shift information, the determination module 32 may determine the corresponding candidate gear shift information as the gear shift information.

When the gear shift mode is the speed first mode of the speed designation mode, among candidate numbers of revolutions included in the pieces of candidate gear shift information, the determination module 32 may determine a candidate number of revolutions having a smallest difference from the set number of revolutions as a target number of revolutions and determine the candidate gear shift information including the determined target number of revolutions as the gear shift information. For example, as described above, in a case in which the set number of revolutions is 2,000 RPM, the set speed is 20 km/h, and the third candidate gear shift information, the fourth candidate gear shift information, and the fifth candidate gear shift information are derived in the speed first mode, the determination module 32 may determine 2,100 RPM which is a candidate number of revolutions having a smallest difference from the set number of revolutions as a target number of revolutions and determine the fourth candidate gear shift information including the target number of revolutions as the gear shift information. Accordingly, the gear shift information may be derived so that a driving speed becomes 20 km/h by allowing the RPM of the engine 150 to become 2,100 RPM, allowing the leading gear stage of the transmission 160 be to the eighth stage, allowing the following gear stage to be the middle stage, allowing coupling of the first clutch unit 163 to be released, and allowing the second clutch unit 164 to be coupled. Meanwhile, in a case in which the candidate derivation module 31 derives only one piece of candidate gear shift information, the determination module 32 may determine the corresponding candidate gear shift information as the gear shift information.

When the gear shift mode is the power mode of the speed designation mode, among the candidate numbers of revolutions included in the pieces of candidate gear shift information, the determination module 32 may determine a largest candidate number of revolutions as a target number of revolutions and may determine the candidate gear shift information including the determined target number of revolutions as the gear shift information. For example, as described above, in a case in which the set speed is 20 km/h, the third candidate gear shift information, the fourth candidate gear shift information, and the fifth candidate gear shift information are derived in the power mode, the determination module 32 may determine 2,350 RPM which is the largest candidate number of revolutions as a target number of revolutions and determine the fifth candidate gear shift information including the target number of revolutions as the gear shift information. Accordingly, the gear shift information may be derived so that a driving speed becomes 20 km/h by allowing the RPM of the engine 150 to become 2,350 RPM, allowing the leading gear stage of the transmission 160 to be the seventh stage, allowing the following gear stage to be the middle stage, allowing the first clutch unit 163 to be coupled, and allowing coupling of the second clutch unit 164 to be released. Meanwhile, in a case in which the candidate derivation module 31 derives only one piece of candidate gear shift information, the determination module 32 may determine the corresponding candidate gear shift information as the gear shift information.

When the gear shift mode is the eco mode of the speed designation mode, among the candidate numbers of revolutions included in the pieces of candidate gear shift information, the determination module 32 may determine a smallest candidate number of revolutions as a target number of revolutions and determine the candidate gear shift information including the determined target number of revolutions as the gear shift information. For example, as described above, in a case in which the set speed is 20 km/h and the third candidate gear shift information, the fourth candidate gear shift information, and the fifth candidate gear shift information are derived in the eco mode, the determination module 32 may determine 1,850 RPM which is the smallest candidate number of revolutions as the target number of revolutions and determine the third candidate gear shift information including the target number of revolutions as the gear shift information. Accordingly, the gear shift information may be driven so that a driving speed becomes 20 km/h by allowing the RPM of the engine 150 to become 1,850 RPM, allowing the leading gear stage of the transmission 160 to be the first stage, allowing the following gear stage to be the high stage, allowing the first clutch unit 163 to be coupled, and allowing coupling of the second clutch unit 164 to be released. Meanwhile, in a case in which the candidate derivation module 31 derives only one piece of candidate gear shift information, the determination module 32 may determine the corresponding candidate gear shift information as the gear shift information.

Referring to FIG. 2, the control unit 4 may control the driving device 140 using gear shift information acquired according to the gear shift mode. The gear shift information is acquired by the acquisition unit 3. The control unit 4 may control the engine 150 and the transmission 160 which are included in the driving device 140 using the gear shift information. The control unit 4 may control the engine 150 to achieve RPM included in the gear shift information. In addition, the control unit 4 may control the transmission 160 using the gear shift information so that either of the first clutch unit 163 and the second clutch unit 164 is coupled. In this case, the control unit 4 may control the transmission 160 so that either of the first leading transmission unit 161 and the second leading transmission unit 162 operates at the leading gear stage included in the gear shift information. The control unit 4 may control the transmission 160 so that either of the first following transmission unit 165 and the second following transmission unit 166 operates at the following gear stage include in the gear shift information. The control unit 4, the acquisition unit 3, and the confirmation unit 2 may be implemented to transmit and receive information through wired communication, wireless communication, or the like.

Referring to FIG. 2, the driving speed control device 1 for an agricultural work vehicle according to the present disclosure may be implemented to control the transmission 160 through a manual operation. In this case, the confirmation unit 2, the acquisition unit 3, and the control unit 4 may be implemented as follows.

First, the confirmation unit 2 may confirm whether any one among the revolution number designation mode, the speed designation mode, and manual mode is selected as the gear shift mode using selection information provided from the mode selection part 172. In this case, the driver may operate the mode selection part 172 to select any one among the revolution number designation mode, the speed designation mode, and the manual mode. In the case in which the speed designation mode includes the speed first mode, the power mode, the eco mode, and the like, the confirmation unit 2 may confirm whether any one among the revolution number designation mode, the speed first mode, the power mode, the eco mode, the manual mode, and the like is selected as the gear shift mode using selection information provided from the mode selection part 172. The driver may operate the mode selection part 172 to select any one among the revolution number designation mode, the speed first mode, the power mode, the eco mode, the manual mode, and the like.

Then, when the gear shift mode is the manual mode, the acquisition unit 3 may acquire gear shift information for shifting the gears using operation information provided from an operation part 173 included in the operation unit 170. The operation part 173 is used in a manual operation. The driver may operate the operation part 173 to manually control the driving device 140. The operation part 173 may include a transmission lever, an acceleration pedal, a gear up/down switch, and the like.

Then, the control unit 4 may control the driving device 140 using gear shift information acquired according to any one gear shift mode selected among the revolution number designation mode, the speed designation mode, and the manual mode. In the case in which the speed designation mode includes the speed first mode, the power mode, the eco mode, and the like, the control unit 4 may control the driving device 140 using gear shift information acquired according to any one gear shift mode selected among the revolution number designation mode, the speed first mode, the power mode, the eco mode, the manual mode, and the like.

Hereinafter, a method of controlling a driving speed of an agricultural work vehicle according to the present disclosure will be described in detail with reference the accompanying drawings.

Figure 3:
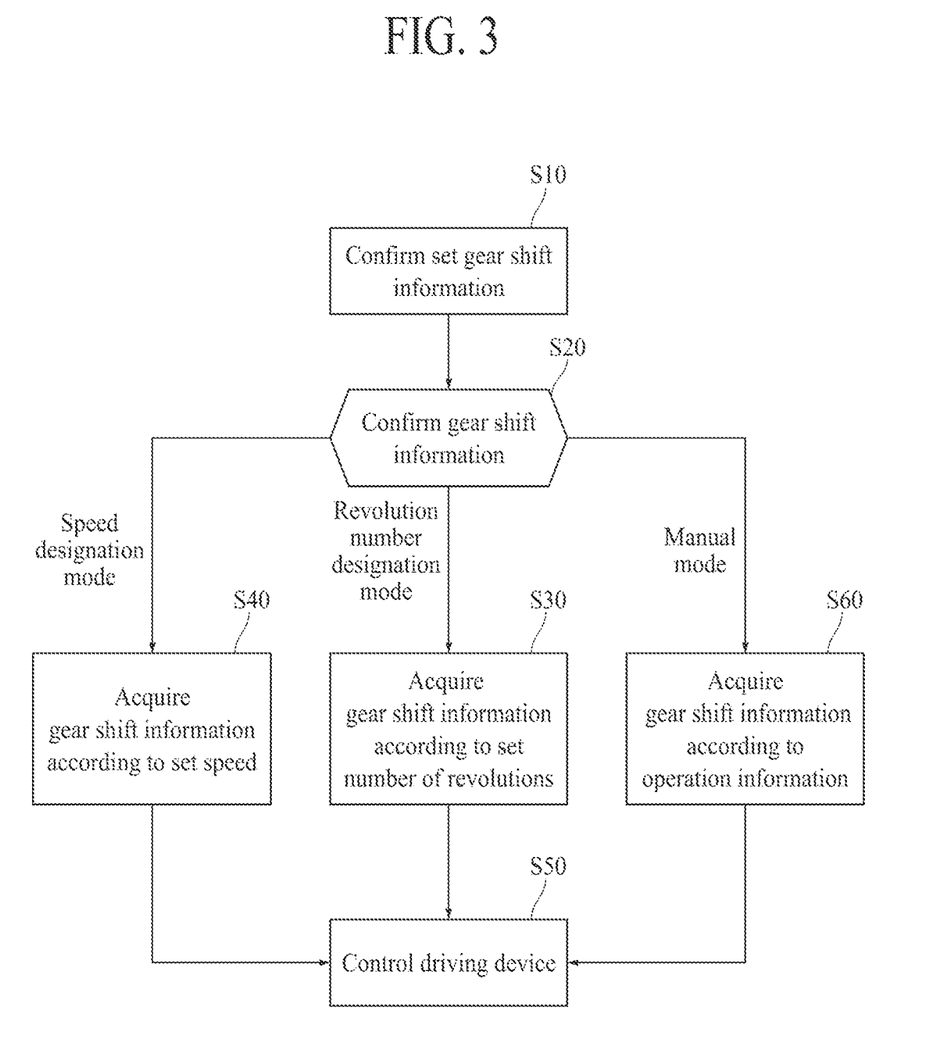
FIGS. 3 to 5 are schematic flowcharts of a method of controlling a driving speed of an agricultural work vehicle according to the present disclosure.

Referring to FIGS. 1 to 3, a method of controlling a driving speed of an agricultural work vehicle according to the present disclosure involves controlling the driving device 140 included in the agricultural work vehicle 100. The method of controlling a driving speed of an agricultural work vehicle according to the present disclosure may be performed by the above-described driving speed control device 1 for an agricultural work vehicle according to the present disclosure. The method of controlling a driving speed of an agricultural work vehicle according to the present disclosure may include the following operations.

First, set gear shift information is confirmed (S10). Operation S10 may be performed by confirming at least one of the set number of revolutions and the set speed. Operation S10 of confirming the set gear shift information may be performed by the confirmation unit 2. The confirmation unit 2 may confirm at least one of the set number of revolutions and the set speed using the set gear shift information provided from the setting part 171.

Then, the gear shift mode is confirmed (S20). Operation S20 may be performed by confirming the gear shift mode for controlling the driving device 140. Operation S20 of confirming the gear shift mode may be performed by the confirmation unit 2. The confirmation unit 2 may confirm the gear shift mode using selection information provided from the mode selection part 172.

In the present embodiment, operation S20 of confirming the gear shift mode is described as being performed after operation S10 of confirming the set gear shift information, but it is not limited thereto. According to implementation, operation S10 of confirming the set gear shift information may also be performed after operation S20 of confirming the gear shift mode is performed.

Then, when the gear shift mode is the revolution number designation mode, gear shift information is acquired according to a target number of revolutions (S30). Operation S30 may be performed by setting the set number of revolutions as the target number of revolutions and acquiring the gear shift information for shifting the gears to the target number of revolutions. Operation S30 of acquiring the gear shift information according to the target number of revolutions may be performed by the acquisition unit 3. The acquisition unit 3 may acquire the gear shift information which allows the gears to be shifted so that the RPM of the engine 150 becomes the target number of revolutions even when a driving speed becomes different from the set speed. Then, when the gear shift mode is the speed designation mode, gear shift information is acquired according to a target speed (S40). Operation S40 may be performed by setting the set speed as the target speed and acquiring the gear shift information for shifting the gears to the target speed. Operation S40 of acquiring the gear shift information according to the target speed may be performed by the acquisition unit 3. Even when the RPM of the engine 150 becomes different from the set number of revolutions, the acquisition unit 3 may acquire the gear shift information which allows a driving speed to become the same as the target speed.

Then, the driving device 140 is controlled (S50). Operation S50 may be performed by controlling the driving device 140 using the gear shift information acquired according to the gear shift mode. Operation S50 of controlling the driving device may be performed by the control unit 4. The control unit 4 may control the driving device 140 using the gear shift information acquired by the acquisition unit 3.

As described above, the method of controlling a driving speed of an agricultural work vehicle according to the present disclosure is implemented to control the driving device 140 using gear shift information suitable for work performed by the agricultural work vehicle 100 using set gear shift information and the gear shift mode. In this case, the set gear shift information may include at least one of the set speed and the set speed. The gear shift information may include the RPM of the engine 150, the leading gear stage and the following gear stage of the transmission 160, whether the first clutch unit 163 is coupled, whether the second clutch unit 164 is coupled, and the like. Accordingly, since the method of controlling a driving speed of an agricultural work vehicle according to the present disclosure is implemented to control the driving device 140 using the gear shift information automatically acquired using the set gear shift information and the gear shift mode, ease and accuracy of an operation of controlling the driving device 140 to be suitable for work performed by the agricultural work vehicle 100 can be improved.

In this case, operation S50 of controlling the driving device may be performed by controlling the engine 150 to achieve the RPM included in the gear shift information. In addition, operation S50 of controlling the driving device may be performed by controlling the transmission 160 using the gear shift information so that any one of the first clutch unit 163 and the second clutch unit 164 is coupled. In this case, operation S50 of controlling the driving device may be performed by controlling the transmission 160 so that any one of the first leading transmission unit 161 and the second leading transmission unit 162 executes the leading gear stage included in the gear shift information. Operation S50 of controlling the driving device may be performed by controlling the transmission 160 so that any one of the first following transmission unit 165 and the second following transmission unit 166 executes the following gear stage included in the gear shift information.

Referring to FIGS. 1 to 5, operation S30 of acquiring the gear shift information according to the target number of revolutions may include the following operations.

Figure 4:
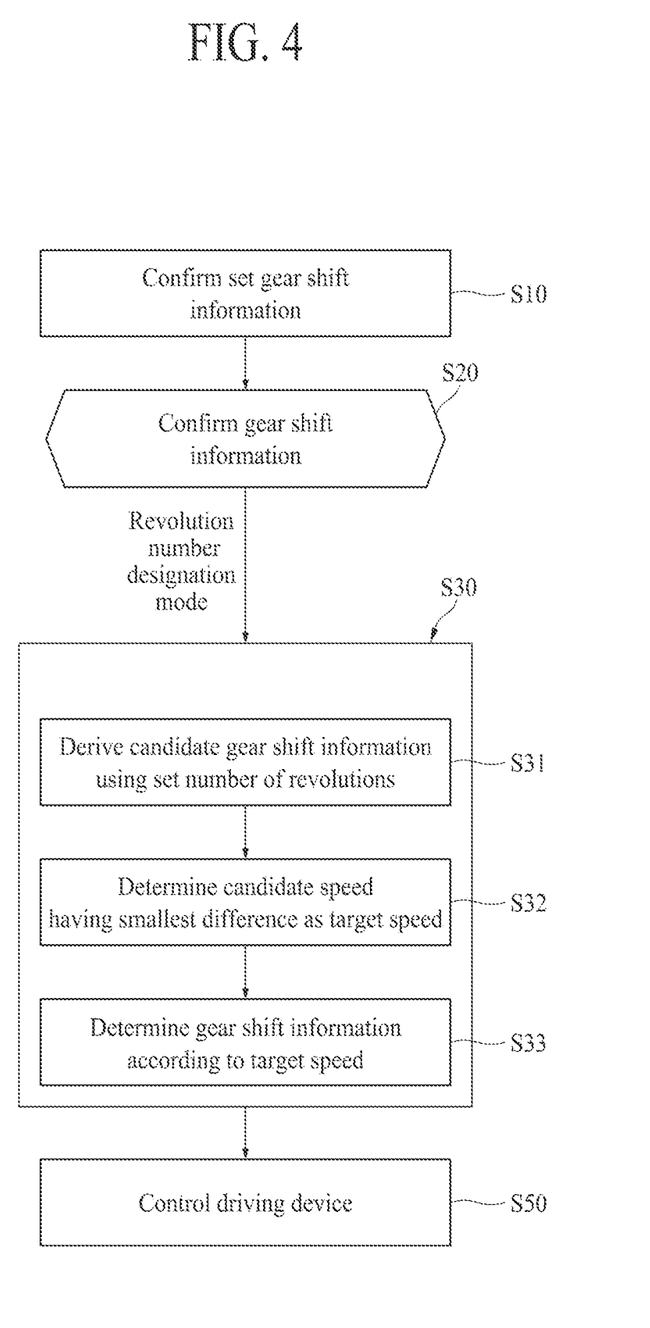

First, candidate gear shift information is derived using the set number of revolutions (S31). Operation S31 may be performed by setting the set number of revolutions as the target number of revolutions and deriving the candidate gear shift information for shifting the gears to the target number of revolutions. Operation S31 of deriving the candidate gear shift information using the set number of revolutions may be performed by the candidate derivation module 31. Even when the driving speed becomes different from the set speed, the candidate derivation module 31 may derive the candidate gear shift information which allows the gears to be shifted so that the RPM of the engine 150 becomes the same as the target number of revolutions. The candidate derivation module 31 may derive the candidate gear shift information which allows the RPM of the engine 150 to become the same as the target number of revolutions and allows the driving speed to become close to the set speed. Operation S31 of deriving the candidate gear shift information using the set number of revolutions may be performed by deriving a plurality of pieces of candidate gear shift information. For example, as described above, in a case in which the set number of revolutions is set to 2,000 RPM, the set speed is set to 20 km/h, and the revolution number designation mode is selected as the gear shift mode, in operation S31 of deriving the candidate gear shift information using the set number of revolutions, the first candidate gear shift information and the second candidate gear shift information may be derived.

Then, a candidate speed having a smallest difference is determined as a target speed (S32). In the case in which the plurality of pieces of candidate gear shift information are derived in operation S31 of deriving the candidate gear shift information using the set number of revolutions, operation S32 of determining the candidate speed having the smallest difference as the target speed may be performed by setting the candidate speed having the smallest difference from the set speed among candidate speeds included in the plurality of pieces of candidate gear shift information as the target speed. Operation S32 of determining the candidate speed having the smallest difference as the target speed may be performed by the determination module 32. For example, as described above, in a case in which the set number of revolutions is 2,000 RPM, the set speed is 20 km/h, and the first candidate gear shift information and the second candidate gear shift information are derived in the revolution number designation mode, in operation S32 of determining the candidate speed having the smallest difference as the target speed, 19 km/h which is a candidate speed having a smallest difference from the set speed may be determined as the target speed. Meanwhile, in a case in which only one piece of candidate gear shift information is derived in operation S31 of deriving the candidate gear shift information using the set number of revolutions, operation S32 of determining the candidate speed having the smallest difference as the target speed may be performed by determining a candidate speed included in the corresponding candidate gear shift information as the target speed.

Then, the gear shift information according to the target speed is determined (S33). Operation S33 may be performed by determining the candidate gear shift information including the determined target speed as the gear shift information. Operation S33 of determining the gear shift information according to the target speed may be performed by the determination module 32. For example, as described above, in a case in which the set number of revolutions is 2,000 RPM, the set speed is 20 km/h, and 19 km/h is determined as the target speed in the revolution number designation mode, in operation S33 of determining the gear shift information according to the target speed, the second candidate gear shift information including 19 km/h which is the target speed may be determined as the gear shift information. Accordingly, the gear shift information may be derived so that the driving speed becomes 19 km/h by allowing the RPM of the engine 150 to become 2,000 RPM, allowing the leading gear stage of the transmission 160 to be the eighth stage, allowing the following gear stage to be the middle stage, allowing coupling of the first clutch unit 163 to be released, and allowing the second clutch unit 164 to be coupled.

Referring to FIGS. 1 to 5, operation S40 of acquiring the gear shift information according to the target speed may include the following operations.

Figure 5:
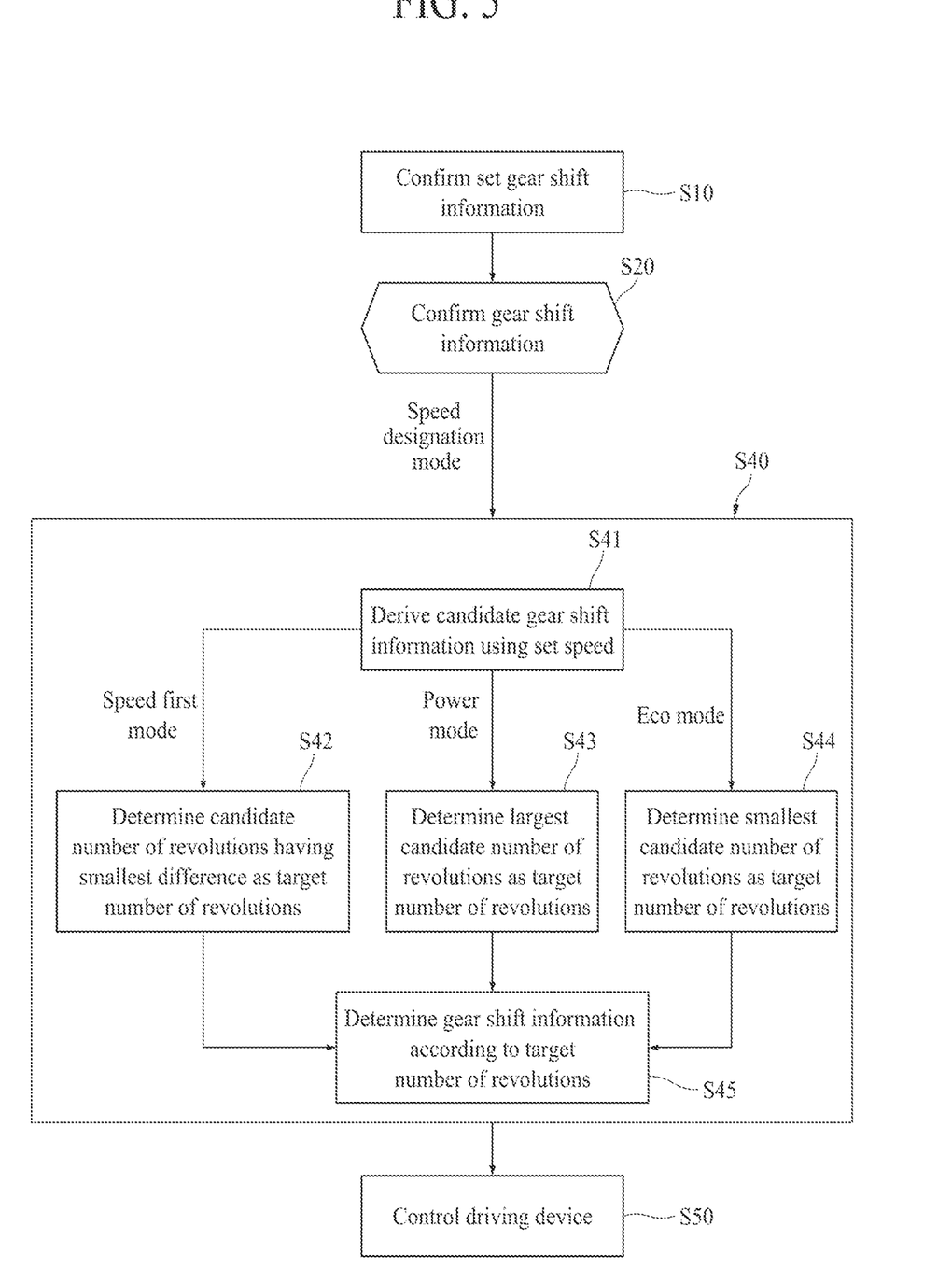

First, candidate gear shift information is derived using the set speed (S41). Operation S41 may be performed by setting the set speed as the target speed and deriving the candidate gear shift information for shifting the gears to the target speed. Operation S41 of deriving the candidate gear shift information using the set speed may be performed by the candidate derivation module 31. The candidate derivation module 31 may derive the candidate gear shift information which allows the gears to be shifted so that a driving speed becomes the same as the target speed even when the RPM of the engine 150 becomes different from the set number of revolutions.

When the gear shift mode is the speed first mode of the speed designation mode, the candidate derivation module 31 may derive candidate gear shift information which allows the gears to be shifted so that a driving speed becomes the same as the target speed, and the RPM of the engine 150 becomes close to the target number of revolutions. In operation S41 of deriving the candidate gear shift information using the set speed, a plurality of pieces of candidate gear shift information may also be derived. For example, as described above, in a case in which the set number of revolutions is set to 2,000 RPM, the set speed is set 20 km/h, and the speed first mode is selected as the gear shift mode, in operation S41 of deriving the candidate gear shift information using the set speed, the third candidate gear shift information, the fourth candidate gear shift information, and the fifth candidate gear shift information may be derived. In addition, when the gear shift mode is the power mode or the eco mode of the speed designation mode, the candidate derivation module 31 may derive candidate gear shift information which allows the gears to be shifted so that a driving speed becomes the target speed. In this case, in operation S41 of deriving the candidate gear shift information using the set speed, a plurality of pieces of candidate gear shift information may also be derived. For example, as described above, when the set number of revolutions is set to 2,000 RPM, the set speed is set to 20 km/h, and the power mode or the eco mode is selected as the gear shift mode, in operation S41 of deriving the pieces of candidate gear shift information using the set speed, the third candidate gear shift information, the fourth candidate gear shift information, and the fifth candidate gear shift information may be derived.

Although the same candidate gear shift information in the speed first mode, the power mode, and the eco mode is exemplified, the present disclosure is not limited thereto, and the candidate gear shift information may be differently derived for each mode.

Then, when the gear shift mode is the speed first mode, a candidate number of revolutions having a smallest difference is determined as a target number of revolutions (S42). In the case in which the plurality of pieces of candidate gear shift information are derived in operation S41 of deriving the candidate gear shift information using the set speed, operation S42 of determining the candidate number of revolutions having the smallest difference as the target number of revolutions may be performed by setting, among candidate numbers of revolutions included in the pieces of candidate gear shift information, a candidate number of revolutions having a smallest difference from the set number of revolutions as the target number of revolutions. Operation S42 of determining the candidate number of revolutions having the smallest difference as the target number of revolutions may be performed by the determination module 32. For example, as described above, in a case in which the set number of revolutions is 2,000 RPM, the set speed 20 is km/h, and the third candidate gear shift information, the fourth candidate gear shift information, and the fifth candidate gear shift information are derived in the speed first mode, in operation S42 of determining the candidate number of revolutions having the smallest difference as the target number of revolutions, 2,100 RPM which is the candidate number of revolutions having the smallest difference from the set number of revolutions may be determined as the target number of revolutions. Meanwhile, in operation S41 of deriving the candidate gear shift information using the set speed, in a case in which only one piece of candidate gear shift information is derived, operation S42 of determining the candidate number of revolutions having the smallest difference as the target number of revolutions may be performed by determining a candidate number of revolutions included in the corresponding candidate gear shift information as the target number of revolutions.

Then, when the gear shift mode is the power mode, a maximum candidate number of revolutions is determined as a target number of revolutions (S43). In the case in which the plurality of pieces of candidate gear shift information are derived in operation S41 of deriving the candidate gear shift information using the set speed, operation S43 of determining the maximum candidate number of revolutions as the target number of revolutions may be performed by setting a largest candidate number of revolutions among the candidate numbers of revolutions included in the pieces of candidate gear shift information as the target number of revolutions. Operation S43 of determining the maximum candidate number of revolutions as the target number of revolutions may be performed by the determination module 32. For example, as described above, in a case in which the set speed is 20 km/h, and the third candidate gear shift information, the fourth candidate gear shift information, and the fifth candidate gear shift information are derived in the power mode, in operation S43 of determining the maximum candidate number of revolutions as the target number of revolutions, 2,350 RPM which is the largest candidate number of revolutions may be determined as the target number of revolutions. Meanwhile, in a case in which only one piece of candidate gear shift information is derived in operation S41 of deriving the candidate gear shift information using the set speed, operation S43 of determining the maximum candidate number of revolutions as the target number of revolutions may be performed by determining a candidate number of revolutions included in the corresponding candidate gear shift information as the target number of revolutions.

Then, when the gear shift mode is the eco mode, a minimum candidate number of revolutions is determined as a target number of revolutions (S44). In the case in which the plurality of pieces of candidate gear shift information are derived in operation S41 of deriving the candidate gear shift information using the set speed, operation S44 of determining the minimum candidate number of revolutions as the target number of revolutions may be performed by setting a smallest candidate number of revolutions among the candidate numbers of revolutions included in the pieces of candidate gear shift information as the target number of revolutions. Operation S44 of determining the minimum candidate number of revolutions as the target number of revolutions may be performed by the determination module 32. For example, as described above, in a case in which the set speed is 20 km/h, and the third candidate gear shift information, the fourth candidate gear shift information, and the fifth candidate gear shift information are derived in the eco mode, in operation S44 of determining the minimum candidate number of revolutions as the target number of revolutions, 1,850 RPM which is the smallest candidate number of revolutions may be determined as the target number of revolutions. Meanwhile, in the case in which only one piece of candidate gear shift information is derived in operation S41 of deriving the candidate gear shift information using the set speed, operation S44 of determining the minimum candidate number of revolutions as the target number of revolutions may be performed by determining a candidate number of revolutions included in the corresponding candidate gear shift information as the target number of revolutions.

Then, the gear shift information according to the target number of revolutions is determined (S45). Operation S45 may be performed by determining the candidate gear shift information including the determined target number of revolutions as the gear shift information. Operation S45 of determining the gear shift information according to the target number of revolutions may be performed by the determination module 32.

For example, as described above, in a case in which the set number of revolutions is 2,000 RPM, the set speed is 20 km/h, and 2,100 RPM is determined as the target number of revolutions in the speed first mode, in operation S45 of determining the gear shift information according to the target number of revolutions, the fourth candidate gear shift information including 2,100 RPM which is the target number of revolutions may be determined as the gear shift information. Accordingly, the gear shift information may be derived so that a driving speed becomes 20 km/h by allowing the RPM of the engine 150 to become 2,100 RPM, allowing the leading gear stage of the transmission 160 to be the eighth stage, allowing the following gear stage to be the middle stage, allowing coupling of the first clutch unit 163 to be released, and allowing the second clutch unit 164 to be coupled.

For example, as described above, in a case in which the set number of revolutions is 2,000 RPM, the set speed is 20 km/h, and 2,350 RPM is determined as the target number of revolutions in the power mode, in operation S45 of determining the gear shift information according to the target number of revolutions, the fifth candidate gear shift information including 2,350 RPM which is the target number of revolutions may be determined as the gear shift information. Accordingly, the gear shift information may be derived so that a driving speed becomes 20 km/h by allowing the RPM of the engine 150 to become 2,350 RPM, allowing the leading gear stage of the transmission 160 to be the seventh stage, allowing the following gear stage to be the middle stage, allowing the first clutch unit 163 to be coupled, and allowing coupling of the second clutch unit 164 to be released.

For example, as described above, in a case in which the set number of revolutions is 2,000 RPM, the set speed is 20 km/h, and 1,850 RPM is determined as the target number of revolutions in the eco mode, in operation S45 of determining the gear shift information according to the target number of revolutions, the third candidate gear shift information including 1,850 RPM which is the target number of revolutions may be determined as the gear shift information. Accordingly, the gear shift information may be derived so that a driving speed becomes 20 km/h by allowing the RPM of the engine 150 to become 1,850 RPM, allowing the leading gear stage of the transmission 160 to be the first stage, allowing the following gear stage to be the high stage, allowing the first clutch unit 163 to be coupled, and allowing coupling of the second clutch unit 164 to be released.

Referring to FIGS. 1 to 3, the method of controlling a driving speed of an agricultural work vehicle according to the present disclosure may further include acquiring gear shift information according to operation information (S60).

Operation S60 of acquiring the gear shift information according to the operation information may be performed by acquiring the gear shift information for shifting the gears using the operation information provided from the operation part 173 when the gear shift mode is the manual mode. Operation S60 of acquiring the gear shift information according to the operation information may be performed by the acquisition unit 3.

In a case in which operation S60 of acquiring the gear shift information according to the operation information is provided, operation S20 of confirming the gear shift mode may be performed by confirming whether any one of the revolution number designation mode, the speed designation mode, and the manual mode is selected as the gear shift mode using the selection information provided from the mode selection part 172. In the case in which the speed designation mode includes the speed first mode, the power mode, the eco mode, and the like, operation S20 of confirming the gear shift mode may be performed by confirming whether any one of the revolution number designation mode, the speed first mode, the power mode, the eco mode, the manual mode, and the like is selected as the gear shift mode using the selection information provided from the mode selection part 172.

In the case in which operation S60 of acquiring the gear shift information according to the operation information is provided, operation S50 of controlling the driving device may be performed by controlling the driving device 140 using the gear shift information acquired according to any one gear shift mode selected among the revolution number designation mode, the speed designation mode, and the manual mode. In the case in which the speed designation mode includes the speed first mode, the power mode, the eco mode, and the like, operation S50 of controlling the driving device may be performed by controlling the driving device 140 using the gear shift information acquired according to any one gear shift mode selected among the revolution number designation mode, the speed first mode, the power mode, the eco mode, the manual mode, and the like.

The present disclosure described above is not limited to the above-described embodiments and the accompanying drawings, and it will be apparent to those skilled in the art that various substitutions, modifications, and changes are possible without departing from the technical spirit of the embodiment.

The invention claimed is:

1. A method of controlling a driving speed of an agricultural work vehicle, comprising:
   confirming set gear shift information for a driving device included in an agricultural work vehicle, wherein the set gear shift information comprises:
   a set number of revolutions for revolution per minute (RPM) of an engine included in the drive device; and
   a set speed for a driving speed for the agricultural work vehicle;
   confirming a gear shift mode for controlling the engine and a transmission which is also included in the driving device; device, wherein the gear shift mode is any one of:
   a revolution number designation mode, where the RPM of the engine becomes the same as the set number of revolutions;
   a speed designation mode, where the driving speed of the agricultural work vehicle becomes the same as the set speed; and
   a manual mode where a driver controls the driving device through a manual operation;
   when the gear shift mode is the revolution number designation mode:
   confirming the set number of revolutions for RPM of the engine from the set gear shift information,
   setting the set number of revolutions as a target number of revolutions, and
   acquiring gear shift information for shifting gears to the target number of revolutions; and
   controlling the driving device using the gear shift information acquired according to the gear shift mode;
   wherein acquiring of the gear shift information for shifting the gears to the target number of revolutions includes:
   setting the set number of revolutions as the target number of revolutions and deriving candidate gear shift information for shifting the gears to the target number of revolutions;
   when a plurality of pieces of candidate gear shift information are derived, among a plurality of candidate speeds included in the pieces of candidate gear shift information, determining a given candidate speed of the plurality of candidate speeds having a smallest difference from the set speed as a target speed; and determining candidate gear shift information including the target speed as the gear shift information.

2. The method of claim 1, comprising:

when the gear shift mode is the speed designation mode, by confirming the set speed for the driving speed of the agricultural work vehicle from the set gear shift information, setting the set speed as a target speed and acquiring gear shift information for shifting the gears to the target speed; and when the gear shift mode is the manual mode, acquiring gear shift information for shifting the gears using operation information provided from an operation part of the agricultural work vehicle.

3. The method of claim 1, comprising, when the gear shift mode is the speed designation mode, confirming the set speed for the driving speed of the agricultural work vehicle from the set gear shift information, setting the set speed as a target speed, and acquiring gear shift information for shifting the gears to the target speed, wherein the acquiring of the gear shift information for shifting the gears to the target speed includes:

setting the set speed as the target speed and deriving candidate gear shift information for shifting the gears to the target speed;

in a case in which a plurality of pieces of candidate gear shift information are derived, when the gear shift mode is a speed first mode of the speed designation mode, among candidate numbers of revolutions included in the pieces of candidate gear shift information, determining a candidate number of revolutions having a smallest difference from the set number of revolutions as a target number of revolutions; and determining candidate gear shift information including the target number of revolutions as the gear shift information.

4. The method of claim 1, comprising, when the gear shift mode is the speed designation mode, confirming the set speed for the driving speed of the agricultural work vehicle from the set gear shift information, setting the set speed as a target speed, and acquiring gear shift information for shifting the gears to the target speed, wherein the acquiring of the gear shift information for shifting the gears to the target speed includes:

setting the set speed as the target speed and deriving candidate gear shift information for shifting the gears to the target speed;

in a case in which a plurality of pieces of candidate gear shift information are derived, when the gear shift mode is a power mode of the speed designation mode, determining a largest candidate number of revolutions among candidate numbers of revolutions included in the pieces of candidate gear shift information as a target number of revolutions; and determining candidate gear shift information including the target number of revolutions as the gear shift information.

5. The method of claim 1, comprising, when the gear shift mode is the speed designation mode, confirming the set speed for the driving speed of the agricultural work vehicle from the set gear shift information, setting the set speed as a target speed, and acquiring gear shift information for shifting the gears to the target speed, wherein the acquiring of the gear shift information for shifting the gears to the target speed includes:

setting the set speed as the target speed and deriving candidate gear shift information for shifting the gears to the target speed;

in a case in which a plurality of pieces of candidate gear shift information are derived, when the gear shift mode is an eco mode of the speed designation mode, determining a smallest candidate number of revolutions among candidate numbers of revolutions included in the pieces of candidate gear shift information as a target number of revolutions; and determining candidate gear shift information including the determined target number of revolutions as the gear shift information.

6. The method of claim 1, wherein the controlling of the driving device using the gear shift information acquired according to the gear shift mode includes controlling the transmission using the gear shift information acquired according to the gear shift mode so that any one of a first clutch unit connected to a first leading transmission unit and a first following transmission unit which are included in the transmission and a second clutch unit connected to a second leading transmission unit and a second following transmission unit which are included in the transmission is coupled.

7. A driving speed control device for an agricultural work vehicle, comprising:

a confirmation unit which confirms set gear shift information for a driving device included in an agricultural work vehicle and a gear shift mode for controlling an engine and a transmission which are included in the driving device;

wherein the set gear shift information comprises a set number of revolutions for revolutions per minute (RPM) of the engine and a set speed for a driving speed of the agricultural work vehicle, and the gear shift mode is any one of a revolution number designation mode where the RPM of the engine becomes the same as the set number of revolutions, a speed designation mode where the driving speed of the agricultural work vehicle becomes the same as the set speed, and a manual mode where a driver controls the driving device through a manual operation an acquisition unit which confirms the set number of revolutions for a RPM of the engine from the set gear shift information and acquires gear shift information based on the set number of revolutions when the gear shift mode is the revolution number designation mode; and a control unit which controls the driving device using the gear shift information acquired according to the gear shift mode;

wherein the acquisition unit includes:

a candidate derivation module which sets the set number of revolutions as a target number of revolutions and derives candidate gear shift information for shifting gears to the target number of revolutions when the gear shift mode is the revolution number designation mode; and a determination module which, when a plurality of pieces of candidate gear shift information are derived, determines a given candidate speed from among a plurality of candidate speeds included in the pieces of candidate gear shift information, having a smallest difference from the set speed as a target speed, and determines candidate gear shift information including the target speed as the gear shift information.

8. The driving speed control device of claim 7, wherein: the acquisition unit confirms the set speed for the driving speed of the agricultural work vehicle from the set gear shift information and acquires gear shift information on the basis of based on the set speed when the gear shift mode is the speed designation mode, and the acquisition unit acquires gear shift information for shifting gears using operation information provided from an operation part of the agricultural work vehicle when the gear shift mode is a manual.

9. The driving speed control device of claim 7, wherein the candidate derivation module confirms the set speed for the driving speed of the agricultural work vehicle from the set gear shift information, sets the set speed as a target speed, and derives candidate gear shift information for shifting gears to the target speed when the gear shift mode is a speed designation mode; and when a plurality of pieces of candidate gear shift information are derived when the gear shift mode is a speed first mode of the speed designation mode, the determination module determines a candidate number of revolutions, among the plurality of candidate speeds included in the pieces of candidate gear shift information, having a smallest difference from the set number of revolutions as a target number of revolutions and determines candidate gear shift information including the target number of revolutions as the gear shift information.

10. The driving speed control device of claim 7, wherein the candidate derivation module confirms the set speed for the driving speed of the agricultural work vehicle from the set gear shift information, sets the set speed as a target speed, and derives candidate gear shift information for shifting gears to the target speed when the gear shift mode is a speed designation mode; and when a plurality of pieces of candidate gear shift information are derived when the gear shift mode is a power mode of the speed designation mode, the determination module determines a largest candidate number of revolutions among candidate numbers of revolutions included in the pieces of candidate gear shift information as a target number of revolutions and determines candidate gear shift information including the determined target number of revolutions as the gear shift information.

11. The driving speed control device of claim 7, wherein the candidate derivation module confirms the set speed for the driving speed of the agricultural work vehicle from the set gear shift information, sets the set speed as the target speed, and derives candidate gear shift information for shifting gears to the target speed when the gear shift mode is a speed designation mode; and when a plurality of pieces of candidate gear shift information are derived when the gear shift mode is an eco mode of the speed designation mode, the determination module determines a smallest candidate number of revolutions among candidate numbers of revolutions included in the pieces of candidate gear shift information as a target number of revolutions and determines candidate gear shift information including the target number of revolutions as the gear shift information.

12. The driving speed control device of claim 7, wherein the control unit controls the transmission using the gear shift information acquired according to the gear shift mode so that any one of a first clutch unit connected to a first leading transmission unit and a first following transmission unit which are included in the transmission and a second clutch unit connected to a second leading transmission unit and a second following transmission unit which are included in the transmission is coupled.

* * * * *